United States Patent
Yang

(10) Patent No.: US 8,392,452 B2
(45) Date of Patent: Mar. 5, 2013

(54) METHOD AND APPARATUS FOR CALLBACK SUPPLEMENTATION OF MEDIA PROGRAM METADATA

(75) Inventor: Ting-hao Yang, Beijing (CN)

(73) Assignee: Hulu LLC, Los Angeles, CA (US)

( * ) Notice: Subject to any disclaimer, the term of this patent is extended or adjusted under 35 U.S.C. 154(b) by 91 days.

(21) Appl. No.: 12/875,823

(22) Filed: Sep. 3, 2010

(65) Prior Publication Data

US 2012/0059847 A1 Mar. 8, 2012

(51) Int. Cl.
*G06F 7/00* (2006.01)
*G06F 17/30* (2006.01)

(52) U.S. Cl. .................. 707/770; 707/796; 709/203

(58) Field of Classification Search .................. 707/769, 707/770, 665, E17.014, E17.108, E17.028, 707/796; 725/32, 86, 88, 116; 709/203, 709/217, 237
See application file for complete search history.

(56) References Cited

U.S. PATENT DOCUMENTS

| | | | |
|---|---|---|---|
| 6,731,625 B1 | 5/2004 | Eastep et al. | |
| 7,197,702 B2* | 3/2007 | Niyogi et al. | 715/234 |
| 7,389,471 B2* | 6/2008 | Croney et al. | 715/209 |
| 7,941,439 B1* | 5/2011 | Lawrence et al. | 707/769 |
| 8,156,448 B2* | 4/2012 | Niyogi et al. | 715/854 |
| 2003/0064716 A1 | 4/2003 | Gailey et al. | |
| 2004/0073691 A1 | 4/2004 | Sun | |
| 2005/0246588 A1* | 11/2005 | Deng et al. | 714/38 |
| 2006/0259588 A1* | 11/2006 | Lerman et al. | 709/219 |
| 2007/0033531 A1* | 2/2007 | Marsh | 715/738 |
| 2008/0071819 A1* | 3/2008 | Monsarrat | 707/102 |
| 2008/0195585 A1 | 8/2008 | Altberg et al. | |
| 2008/0207190 A1 | 8/2008 | Altberg et al. | |
| 2009/0028317 A1 | 1/2009 | Ling et al. | |
| 2009/0249222 A1* | 10/2009 | Schmidt et al. | 715/751 |
| 2009/0262668 A1* | 10/2009 | Hemar et al. | 370/260 |
| 2010/0169497 A1* | 7/2010 | Klimentiev et al. | 709/228 |
| 2011/0271306 A1* | 11/2011 | Kahn et al. | 725/68 |
| 2012/0059847 A1* | 3/2012 | Yang | 707/770 |
| 2012/0124621 A1* | 5/2012 | Wendling | 725/32 |

OTHER PUBLICATIONS

Doo-Hyun Kim, Seung-Min Park ; Ji-Yong Kim ; Dong-Myung Sul, and Kyung-Hee Lee—"Collaborative multimedia middleware architecture and advanced Internet call center"—Information Networking, 2001. Proceedings. 15th International Conference on—IEEE 2001—pp. 246-250.*

Pouria Amirian and Ali A. Alesheikh—"A Service Oriented Framework for Disseminating Geospatial Data to Mobile, Desktop and Web Clients"—World Applied Sciences Journal 3 (1): 140-153, 2008, ISSN 1818-4952 © IDOSI Publications, 2008.*

International Search Report, PCT Application No. PCT/US2011/050407, mailed Jan. 17, 2012.

* cited by examiner

*Primary Examiner* — Anh Ly

(74) *Attorney, Agent, or Firm* — Fountainhead Law Group P.C.

(57) ABSTRACT

A method and apparatus for obtaining media program metadata is disclosed. In one embodiment, the method comprises the steps of receiving a media program callback message in a content delivery system from a client device displaying a webpage retrieved from a host server, the media program embedded in the retrieved webpage, the callback message comprising a callback address to the webpage, and storing the address as metadata associated with the media program in the database.

20 Claims, 8 Drawing Sheets

```
<html><!-- #BeginTemplate "Templates/main.dwt" -->
<head>
<!-- #BeginEditable "doctitle" -->
<title>The Eastern Sierra</title>
<!-- #EndEditable -->
<meta http-equiv="Content-Type" content="text/html; charset=iso-8859-1">
<meta name="keywords" content="mountains, fishing, eastern sierra, skiing, mammoth, US395">
<meta name="description" content="The Eastern Sierra is an adult playground for the outdoorsperson.">
<link rel="stylesheet" href="main.css">
/*
 :

<div id=relevant-contnent' class='post-body entry-content'>
The Eastern Sierra has some of the best skiing available anywhere in the U.S. Mammoth Mountain is the largest ski resort in the West,
and is typically open from October through June, boasting one of the longest ski seasons in the country. Nearby June Mountain offers
a no-hassle alternative with plenty of skiing and very few crowds.</div>

:

</script>
</body>
</html>
```

500

502 (bracket indicating the div block)

FIG. 5

```
<html><!-- #BeginTemplate "Templates/main.dwt" -->
<head>
<!-- #BeginEditable "doctitle" -->
<title>The Eastern Sierra</title>
<!-- #EndEditable -->
<meta http-equiv="Content-Type" content="text/html; charset=iso-8859-1">
<meta name="keywords" content="mountains, fishing, eastern sierra, skiing, mammoth, US395">
<meta name="description" content="The Eastern Sierra is an adult playground for the outdoorsperson.">
<link rel="stylesheet" href="main.css">
/*
...

<div id=relevant-contnent' class="post-body entry-content">    ⎫
The Eastern Sierra has some of the best skiing available anywhere in the U.S. Mammoth Mountain is the largest ski resort in the West,  ⎬ 502
and is typically open from October through June, boasting one of the longest ski seasons in the country. Nearby June Mountain offers   ⎭
a no-hassle alternative with plenty of skiing and very few crowds.</div>

<embed width="320" height="266"                                  ⎫
src="http://contentenhancementserver.com/contextSensitiveVideoPlayer.swf"  ⎬ 602
type="application/x-shockwave-flash" targetContent="relevant-content"></embed>  ⎭

...

</script>
</body>
</html>
```

*FIG. 6*

METHOD AND APPARATUS FOR CALLBACK SUPPLEMENTATION OF MEDIA PROGRAM METADATA

BACKGROUND OF THE INVENTION

1. Field of the Invention

The present invention relates to systems and methods for providing media programs to remote users, and in particular, to a system and method for supplementing media program metadata with information obtained from callbacks from embedded media programs.

2. Description of the Related Art

The dissemination and playback of media programs has undergone substantial changes in the past decade. Previously, media programs were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and satellite), this method of dissemination and playback has become competitive with traditional means. Dissemination of media programs via the Internet may occur either by simple downloading, progressive downloading or streaming, and may be accomplished via dial-up, DSL, ADSL, cable, T1, or other high speed internet connections.

With simple downloading, a media file having the media program is downloaded to the user's computer, where it can be played back. Playback of the media file cannot commence until the entire file is downloaded, since the bytes of the media file in any convenient order, and not necessarily from the beginning to the end.

With progressive downloading, is similar to simple downloading, but instead of downloading portions of the media file in any convenient order, progressive downloading downloads the media file from the beginning and continues downloading the file sequentially and consecutively until the last byte. This typically permits the playback of the media program before the entire media file has been downloaded, so long as the media player has downloaded enough information to support playback. However, at any particular time during progressive downloading, some portions of the file (e.g. the portions at the end of the file) are not immediately available for playback. Playback is often delayed by slow Internet connections and is also often choppy and/or contains a high likelihood of stopping after only a few seconds. Downloaded material is thereafter stored on the end-user computer. Progressive downloading is typically performed by a web server.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user will have to wait a period of time before playback can begin. If playback speed exceeds the data transfer speed, playback may be paused for a period of time while additional data is downloaded. However, the video playback quality will be higher when the playback occurs because of the higher data rate. For example, if a 100 kbps video file can be delivered over a 56 kbps modem, the video will be presented at the 100 kbps rate, but there may be periods when playback will be paused while additional video data is downloaded. The video data is typically downloaded as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media is delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Streaming media is often delivered from one or more dedicated streaming media servers.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media sever communicates with the media server using control messages and data messages to adjust to changing network conditions as the video is played. These control messages can include trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

Selecting Media Programs for Viewing

On-demand streaming media services allow a broad spectrum of media programs to be made available to the user for immediate viewing. One of the challenges in providing on-demand streaming media services is to provide the user with an interface that allows the user to efficiently select which media program they would like to view. In the golden era of broadcast television, a small number of channels were available, and it was a simple matter for the user to simply check each channel or refer to a printed guide. The advent of satellite or cable television multiplied the number of such channels, and provided program guides similar to the printed schedules. However, the number of channels was still relatively limited. The storage capacity of DVRs is such that simple hierarchical menu interfaces permit the user to easily and quickly gain access to recorded programs.

One way to provide the user with information about available media programs is to provide the user with the ability to search a database of metadata regarding available media programs. Such metadata may include factors such as the source of the media program, actors, genre (drama, comedy), target age group, and/or one or more thumbnails (small still video frames of the media program) of the media program. Metadata can be used to assist the user in searching for the media program of interest or to assist the media program disseminator to organize the media programs in a way that conveniently allows the user to find the media program of interest. However, keyword searches and program guides are only as good as the metadata they rely upon, and the more complete and accurate the metadata associated with media programs is, the more useful and accurate the search and program guide functions are. At the same time, it is difficult to maintain a complete and accurate database of all of the metadata available regarding a particular media program, and new metadata is constantly being created by sources independent from the media program provider or the program source. For example, independent websites and blogs often include useful metadata about media programs. Such information can be discovered using a web crawler, but the process is time consuming and often misses potentially useful information.

Streaming media and progressive downloading allows the media to be played back via media players that can be embedded in the webpages of third parties. Such webpages may also include links to media programs (whether batched, progressively downloaded, or streamed). Examples of embedded media players include commercial entities such as AMAZON (www.amazon.com), who may embed a media player in one of their hosted webpages and a blogger, who may embed a media program player in their hosted webpages to playback a video of interest to the readers.

Websites having embedded media programs often offer metadata regarding the media program, yet such websites may not be included in a webcrawling session. In fact, the uniform resource locator (URL) of the website having the embedded media program is itself metadata that can be of interest. Accordingly, there is a need for a method and apparatus to enhance media program metadata with the address of websites embedding the media program and with data available at such websites. The present invention satisfies this need.

SUMMARY OF THE INVENTION

To address the requirements described above, the present invention discloses a method and apparatus for obtaining metadata associated with a media program. In one embodiment, the method comprises the steps of receiving a media program callback message in a content delivery system from a client device displaying a webpage retrieved from a host server, the media program embedded in the retrieved webpage, the callback message comprising a callback address to the webpage, and storing the address as metadata associated with the media program in the database. In another embodiment, the invention is embodied in an apparatus comprising a content delivery system comprising a communications module for receiving a media program callback message from a client device displaying a webpage retrieved from a host server, the media program embedded in the retrieved webpage, the callback message comprising a callback address to the webpage, and a database for storing the address as metadata associated with the media program.

BRIEF DESCRIPTION OF THE DRAWINGS

Referring now to the drawings in which like reference numbers represent corresponding parts throughout:

FIG. 5 is a diagram showing exemplary webpage source code for a blog; and

FIG. 6 is a diagram presenting webpage source code modified by including coded instructions for embedding a media program and media program player in the webpage.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
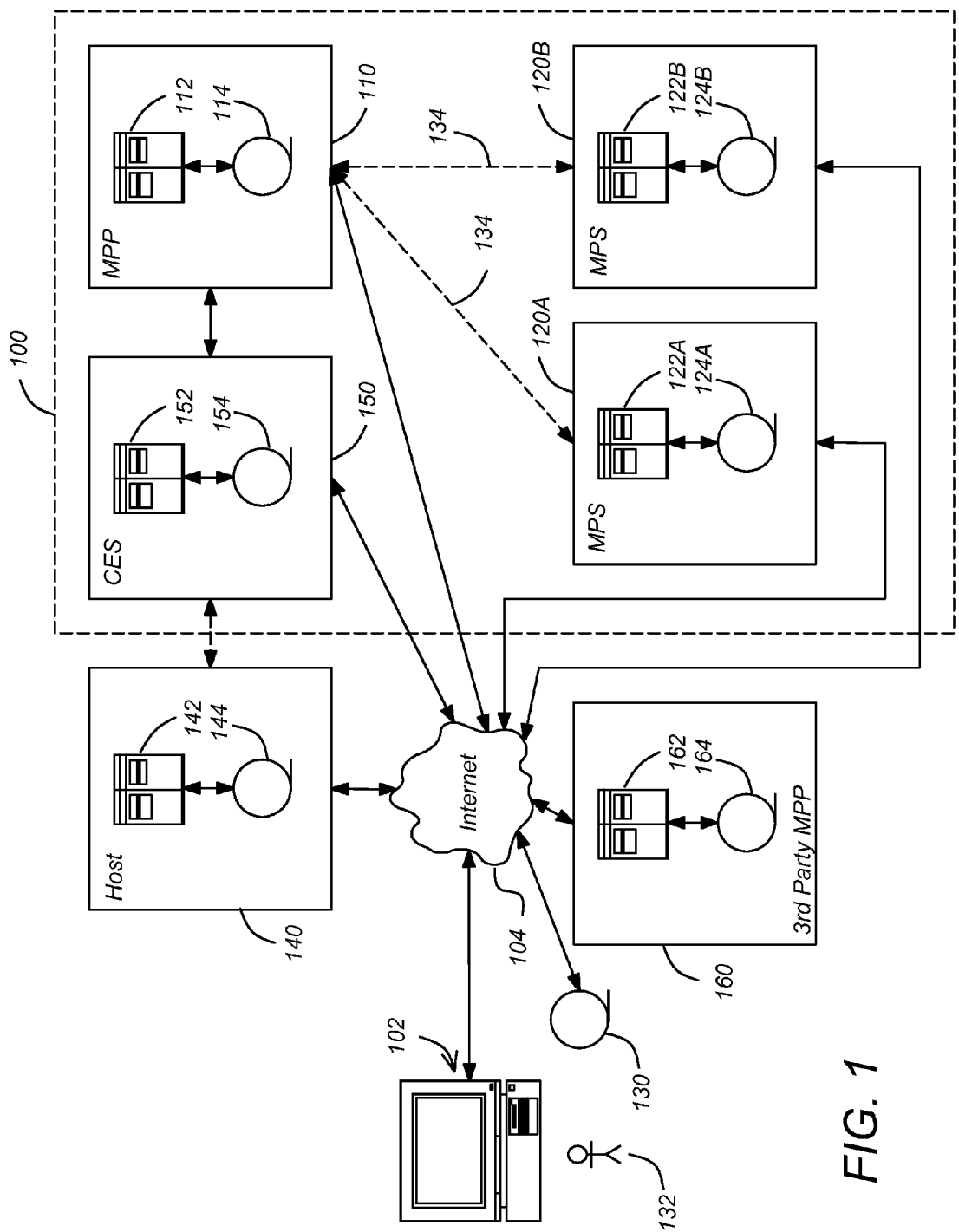
FIG. 1 is a diagram illustrating an exemplary content delivery system and related elements.

FIG. 1 is a diagram illustrating an exemplary content delivery system 100 and related elements. In the illustrated embodiment, the content delivery system 100 may comprise one or more media program sources (MPS) 120A, 120B, communicatively coupled to a communication network 104 such as the Internet and each having one or more source video servers 122A, 122B communicatively coupled to one or more source media program databases 124A, 124B. The content delivery system 100 further comprises a media program provider (MPP) 110, communicatively coupled to the communication network 104, and having one or more provider computers 112 and a provider media program database 114, which may store metadata and other information about the media programs. The computers 112 can include one or more media servers, a web server, and any other processing elements necessary to perform the steps and functions described below. In one embodiment, the MPP 110 is a video-on-demand and/or streaming media program provider.

The media program may be provided to a client device 102 (hereinafter alternatively referred to as a user computer 102) by the MPP 110, or by a MPS 120, which may be a commercially separate entity from the MPP 110.

To provide the media program directly from the MPP 110 to the user computer 102, the MPP 110 licenses or purchases media programs from the media program sources 120 (such as www.fox.com or www.nbc.com). Typically, the MPS 120 also provides metadata for such programs. This metadata is typically adequate (e.g. it need not be supplemented by information from other sources) and can be stored and retrieved by the MPP database 114 for use.

When the media programs are provided directly from the MPP(s) 120 instead of the MPP 110, it is often the case that the metadata provided by the media program source 120 is insufficient. In such cases, supplementary metadata may be obtained from an independent media program source 130 (such as www.tv.com or www.imdb.com) or other third party sources. In this circumstance, the role of the media program provider 110 is that of a portal that provides users 132 a list of available media programs and an interface that allows the user to search for such programs and to view them.

Media programs and metadata may be obtained via the communication network 104 or through auxiliary (and/or dedicated) communication links 134 by webcrawling (for example, using a program or automated script that browses the World Wide Web in a methodical, automated manner).

Using the client computer 102, remote users 132 can communicate with the media program provider 110, to obtain media programs (including video-on-demand and/or streaming video services) and to search the provider media program database 114 to find media programs of interest.

Using the client computer 102, remote users 132 can also transmit and receive information from third party entities 140 communicatively coupled to the Internet. Such third party entities include, for example, search portals (e.g. www.yahoo.com or www.google.com) or servers hosting information such as commercial information or blogs. Hereinafter, servers hosing such information are alternately referred to as host servers. In either case, the third party entity 140 may include a server 142 and a database 144.

The content delivery system 100 may also include a content enhancement system 150 having a content enhancement server 152 communicatively coupled to an associated content enhancement database 154. The content enhancement system 150 transmits coded instructions to the third party entities 140 to be included in the webpages hosted by the third party entity 140 as further described below. The coded instructions may comprise a servlet, a snippet, an applet, a plurality of HTML instructions, or any other analogous code. When executed, these coded instructions provide a reference to media programs stored in the media program system 100 or hosted by third party media program providers 160 that are commercially separate from the media program system 100. The third party media program providers 160 may also include one or more servers 162 communicatively coupled to one or more databases 164.

Typically, the content enhancement system 150 and the media program provider 110 are commercially indistinct entities. The media program sources 120A, 120B are typically commercially distinct from the content enhancement system 150 and the media program provider 110. Third party host entity 140 is likewise typically commercially distinct from the media program provider 110 and the content enhancement system 150, but also commercially distinct from the media program sources 120A, 120B. Similarly, the third party media program provider 160 is typically commercially distinct from the media program provider 110 and the content enhancement system 150, as well as the media program providers 150A, 150B, and the third party host entity 140. However, the present invention may be practiced in embodiments where any of the foregoing elements are commercially indistinct or commercially distinct. As the term is used herein, a commercially distinct entity is one which is not partially or wholly owned by the other.

Figure 2:
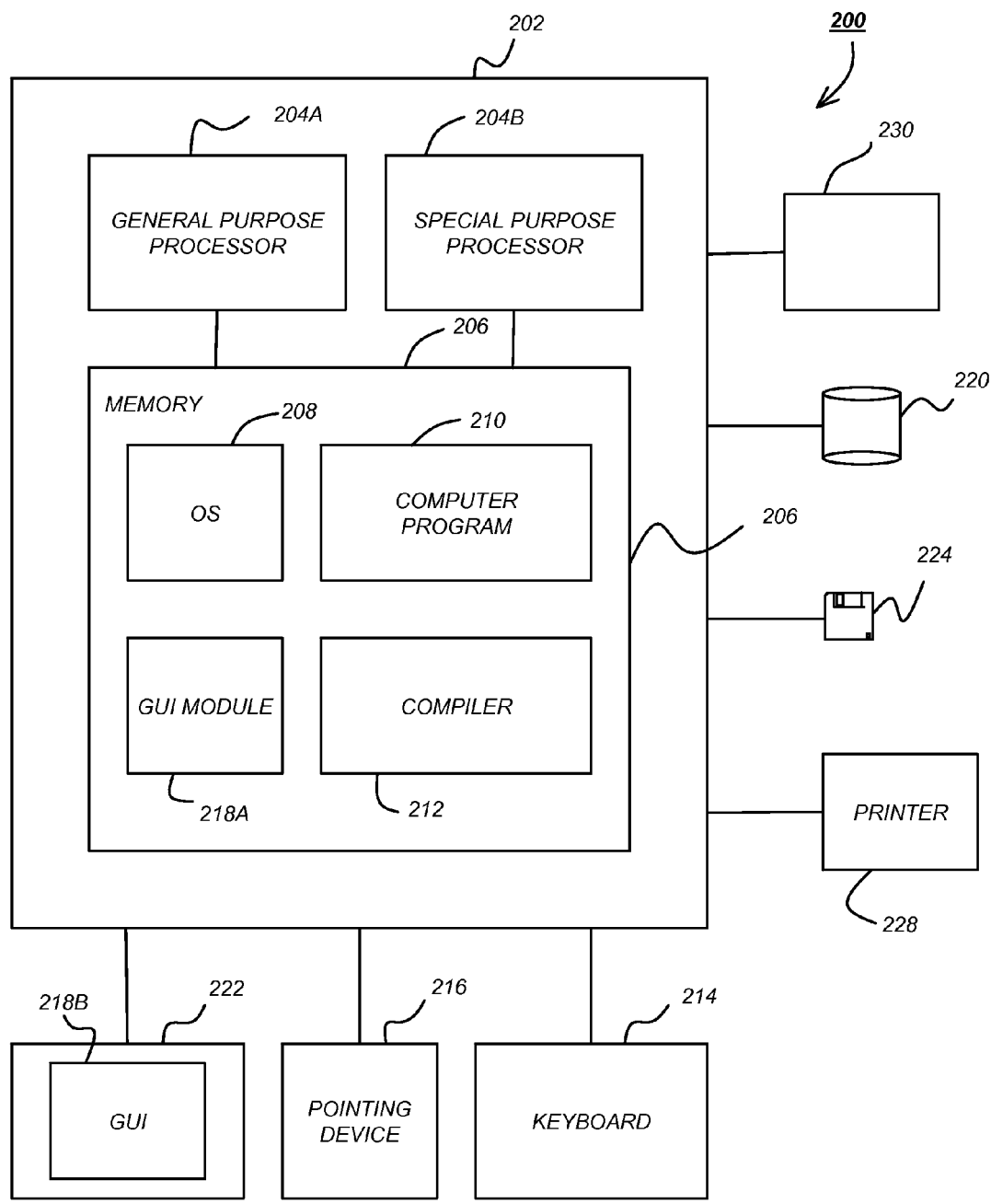
FIG. 2 is a diagram illustrating an exemplary computer system that could be used to implement elements of the present invention.

FIG. 2 is a diagram illustrating an exemplary computer system 200 that could be used to implement elements of the present invention, including elements of the user computer 102, third party hosts 140, third party media program providers 160, MPS 120, content enhancement system (CES) 150 and MPP 110. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable pixels formed by liquid crystals. Each pixel of the display 222 changes to an opaque or translucent state to form a part of the image on the display in response to the data or information generated by the processor 204 from the application of the instructions of the computer program 210 and/or operating system 208 to the input and commands. Other display 222 types also include picture elements that change state in order to create the image presented on the display 222. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 210 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and/or the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, or a flash drive. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 202.

Although the term "computer" is referred to herein, it is understood that the computer may include portable devices such as cellphones, portable MP3 players, video game consoles, notebook computers, pocket computers, or any other device with suitable processing, communication, and input/output capability.

Figure 3A:
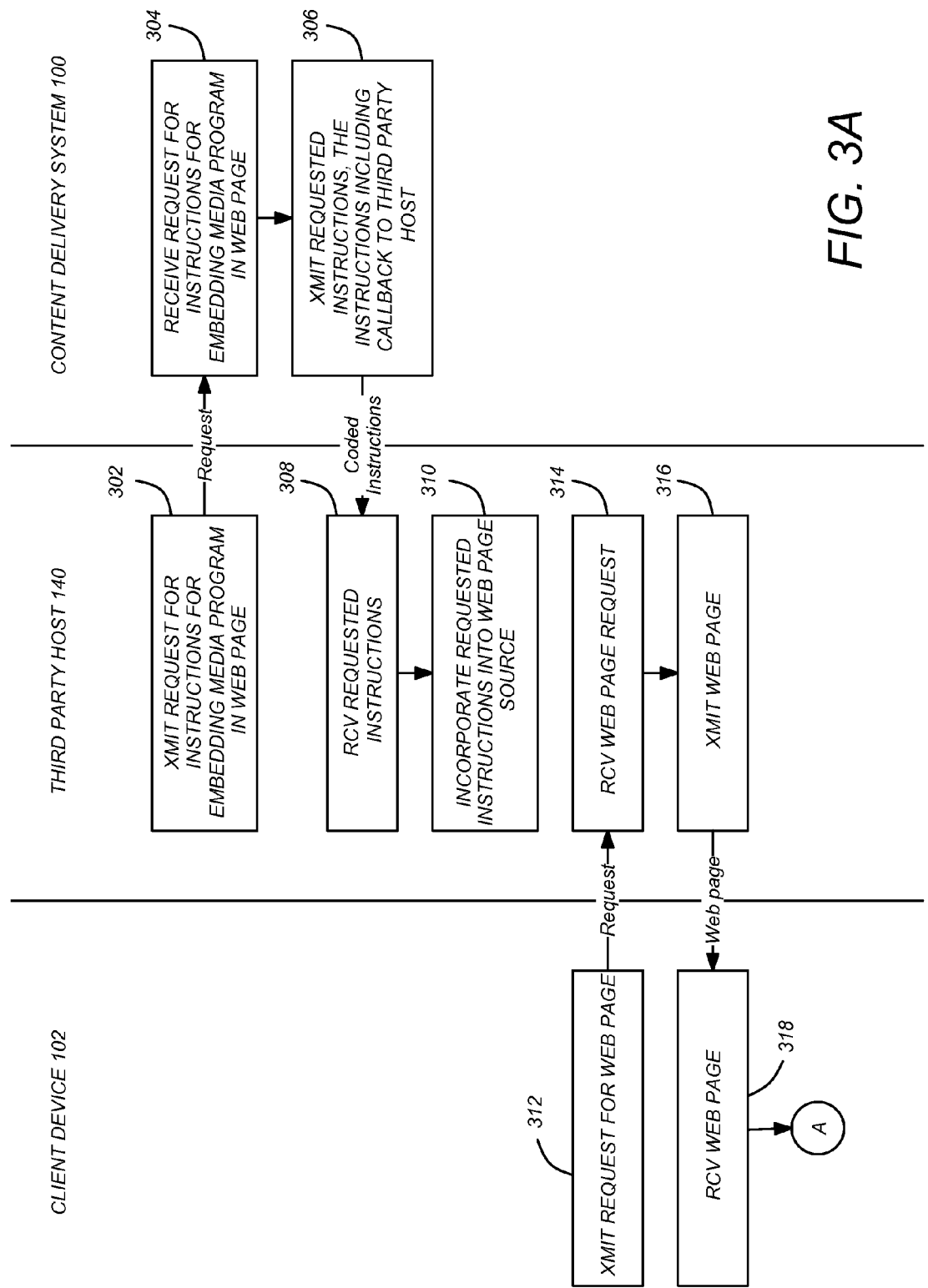
FIGS. 3A-3C are a diagrams presenting exemplary steps that can be used to practice one embodiment of media program metadata system.
Figure 3B:
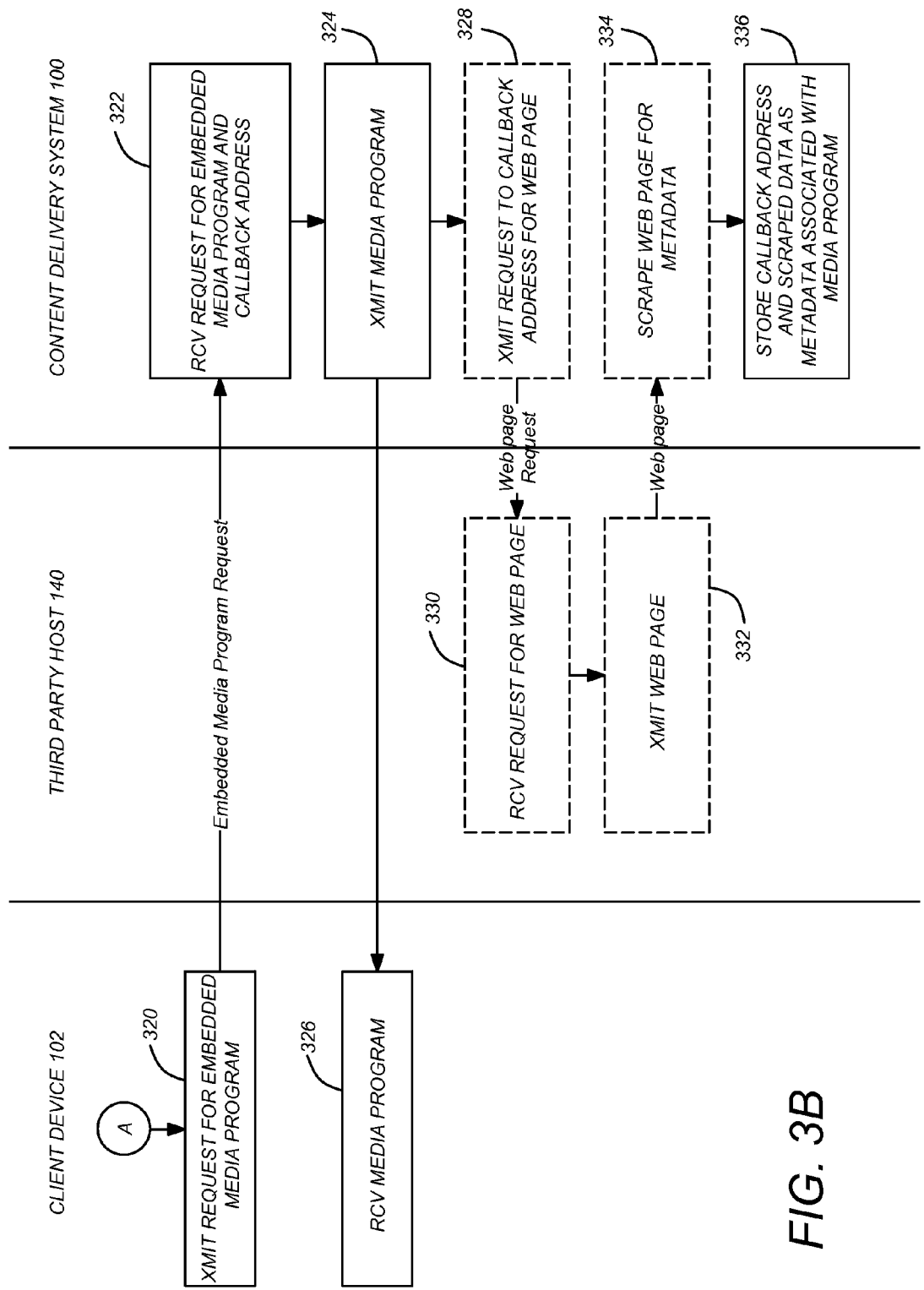
Figure 3C:
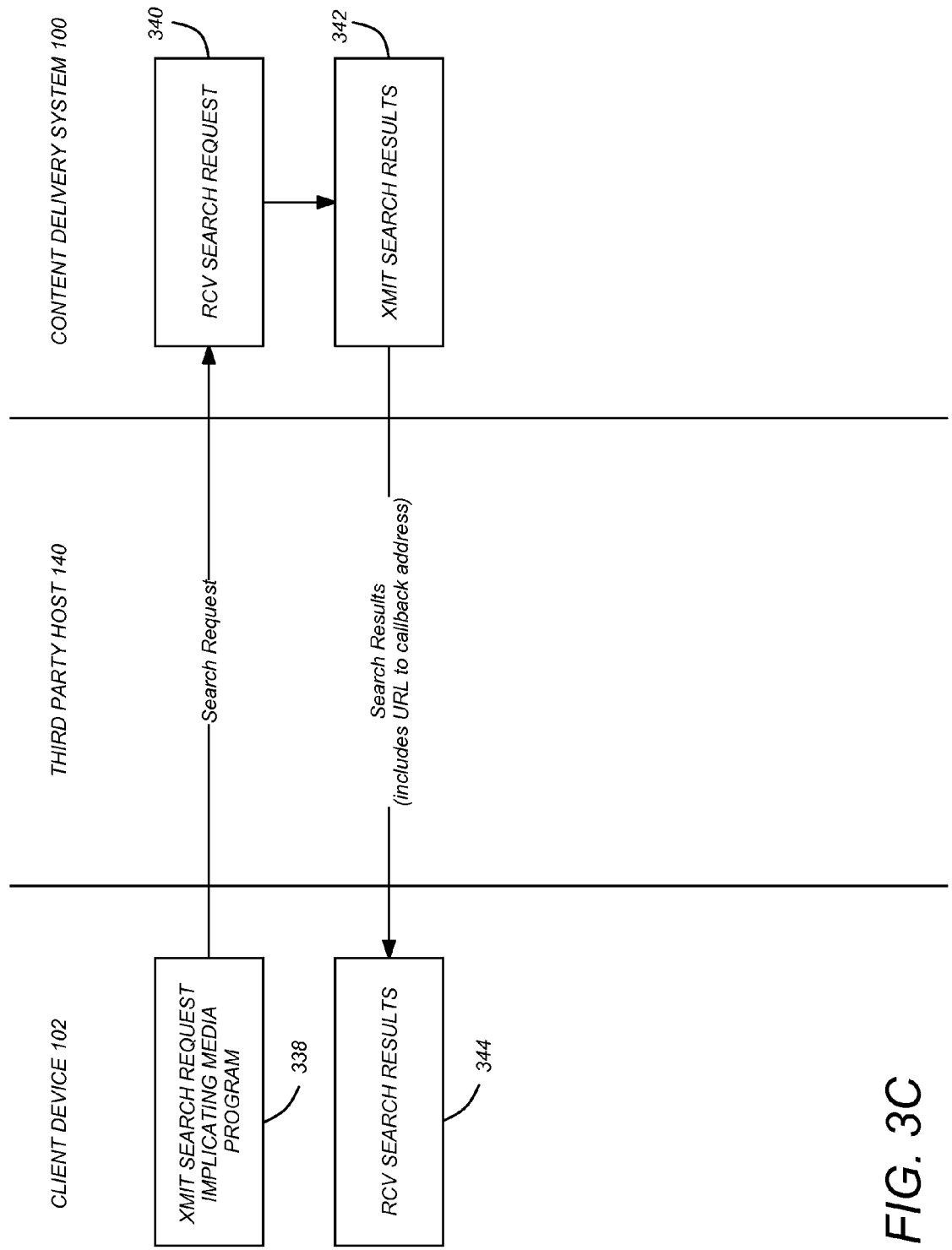

FIGS. 3A-3C are a diagrams presenting exemplary steps that can be used to practice one embodiment of media program metadata system. In block 302, the third party host 140 transmits a request to the content delivery system 100 for instructions for embedding a media program in a webpage hosted by the third party. The content delivery system 100 receives the request and transmits the requested instructions to the third party host 140 as shown in blocks 304 and 306.

Figure 4:
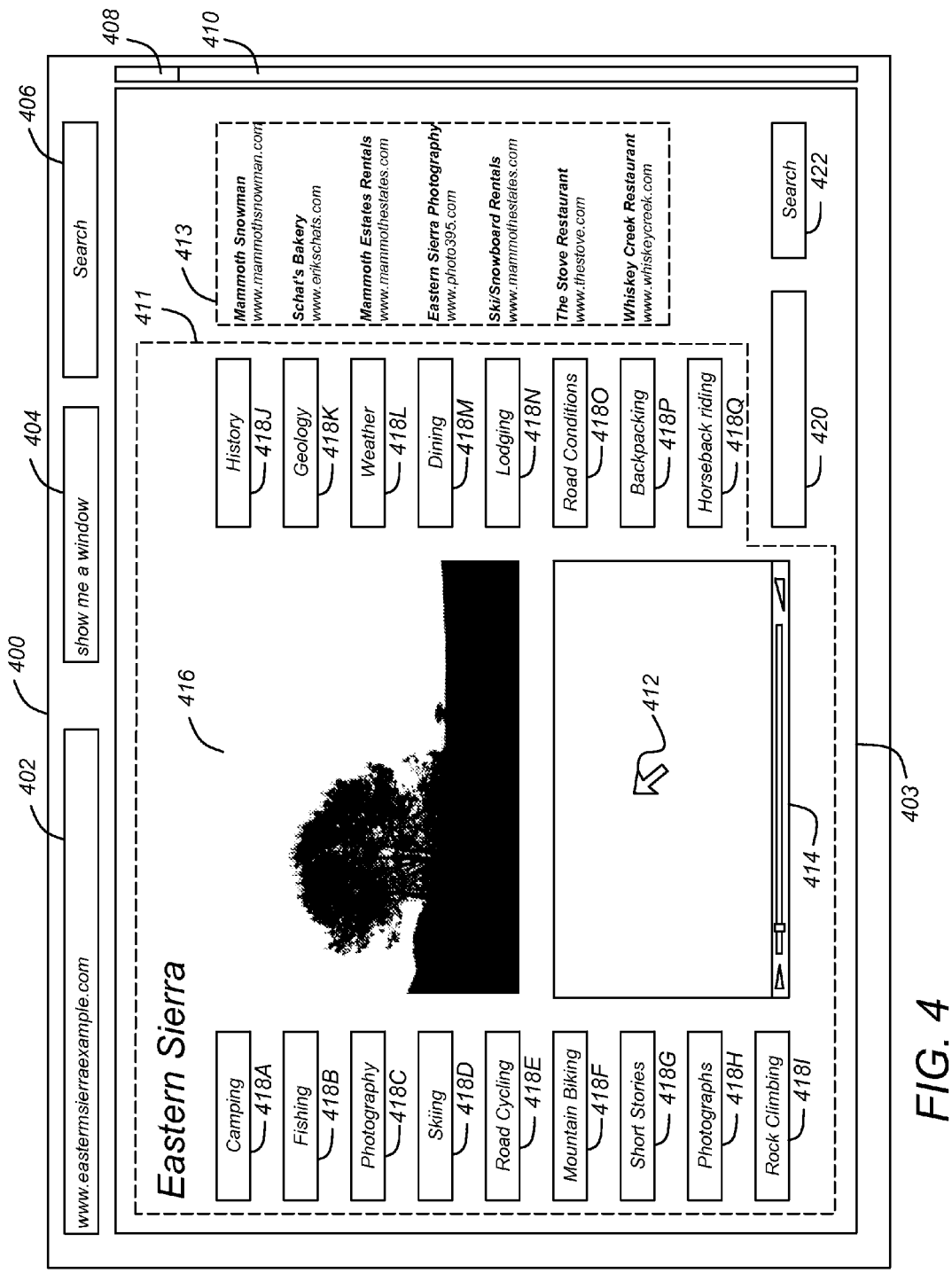
FIG. 4 is a diagram of an exemplary browser presenting an exemplary rendered webpage having an embedded media program.

FIG. 4 is a diagram of an exemplary browser 400 presenting an exemplary rendered webpage 403 having an embedded media program. The webpage 403 is an image manifested on a computer display 222, the contents of which is determined by executing a file that comprises source code (alternatively referred to hereinafter as "webpage source" or "webpage source code") that is typically expressed in a markup language such as HTML using a plurality of textural characters. When the source code is read and interpreted by the browser implemented on the computer (described further below), the browser 400 generates data to present the webpage on a display 222 communicatively coupled to the user computer 102.

In this context, webpage source code is a text file that comprises text describing content as well as commands. The commands include commands describing how the content is to be presented (e.g. by including one or more sets of HTML tags that describe how the text should be formatted when presented by the browser 400) and where the content may be obtained. The commands may also include commands for generating webpage controls that are used to activate certain webpage functionality.

In the illustrated embodiment, the browser 400 includes an address input region 402, a search query input region 404, and a search button 406. The browser 400 may also include a scroll handle 408, which, by use of a mouse and associated pointer 412 can be selected and moved throughout the scroll region 410 to view a webpage 403 too large to depict in the browser 400 at one time.

When rendered, the webpage 403 may include a substantive content portion 411 and an advertising portion 413. The advertising portion 413 may used to present advertising to the user, and such advertising may or may not be relevant to the substantive content of the webpage 403. "Advertising" in this context, is defined as information that, for a fee or other compensation charged to the advertiser, is provided to potential customers regarding products or services that the potential customers may be interested in purchasing.

The substantive content portion 411 includes information directed solely to the subject matter of the webpage 403, and does not include advertising. Although illustrated as a contiguous portion, the substantive content portion 411 may comprise a plurality of separate portions in different locations in the webpage 403.

The rendered webpage 403 may also include plurality of controls 418A-418Q (hereinafter alternatively referred to as controls 418) related to categories of information and each of which is associated with the URL of another webpage that presents content related to the indicated category. The controls 418 are defined by appropriate commands in the webpage source.

The rendered webpage 403 may also include an embedded media program player 414. The embedded media program player 414 can be used to play media programs that are downloaded, streamed, or progressively downloaded from the host website (e.g. the website hosting the currently viewed webpage) or third party websites. This can be accomplished by including appropriate embedded media program player 414 instructions into the webpage source. Typically, such instructions include a link to the URL of the media program in the webpage 403.

The media program player 414 is implemented using webpage source obtained, for example, from the content delivery system 100.

FIG. 5 is a diagram showing exemplary webpage source code 400 for a blog. The source code 400 includes substantive content 502 which may include text and other information.

FIG. 6 is a diagram presenting webpage source code modified by including coded instructions 602 for embedding a media program and media program player in the webpage. The coded instructions 602 could simply be instructions for embedding the media program in the webpage 403, or could include additional instructions that cause the URL of the webpage 403 to be transmitted to the media program provider 400 when the user computer 102 requests the webpage 402. This function can also be performed by a referrer browser function. For example, an HTTP referrer occurs as an HTTP header field of an HTTP request, and identifies, from the point of view of a resource such as a webpage, the address of the resource that links to it. In the above example, the HTTP referrer points to the URL of the webpage 402. Hence, by checking the referrer, the new page can determine where the request came from.

In one embodiment, the coded instructions comprise a plurality of instructions written in hypertext markup language (HTML), but other languages and expressions such as XML may be used. In another embodiment, the coded instructions are embodied by one or more applets or function calls to a source from which other coded instructions may be obtained and executed by the client computer 102. For example, the coded instructions incorporated into the webpage source may have an applet or function call specifying a URL. When the client computer 102 executes that applet or function call further coded instructions which perform the function of generating the keywords (which may be written in HTML or a similar language) are received directly from the specified URL, which would be the content enhancement server 152 or other source. These further coded instructions 602 are then executed by the client computer 102 to obtain the callback address, if necessary. The use of an applet or similar artifice to obtain the coded instructions from the content enhancement server 152 is particularly useful in situations where content enhancement server 152 is trusted or when privacy is not a concern for the contents on the host server 142. It also frees the host server 142 from transmitting detailed coded instructions and allows the content enhancement server 152 to implement updates to the coded instructions without requiring any changes to the webpage source transmitted from the host server to the client computer 102. Coded instructions may also be transmitted via the Internet 104 or by any other means, including transmission via sneakernet (e.g. transmission via a tangible data storage device such as a DVD, flash drive or floppy disk).

Returning to FIG. 3A, the coded instructions are received by the third party host 140 and incorporated into the webpage source, as shown in blocks 308 and 310. In block 312, the user device 102 transmits a request for the webpage 403 having the embedded video coded instructions 602 to the third party host 140 at the webpage's URL. The third party host 140 receives the webpage request and transmits the webpage data (e.g. the source) to the user device 102. This is shown in blocks 314 and 316. The user device 102 receives the webpage source, as shown in block 318, and executes the source to present the webpage 403 to the user 132 on the display 222, with a result such as shown in FIG. 4.

Executing the coded instructions, the user device 102 transmits a request for the embedded media program to the content delivery system 100, as shown in block 320. The request includes the callback address or address of the referring webpage 403. The content delivery system 100 receives the request and transmits the media program to the user device, where it is received and presented to the user 132. This is shown in blocks 322-326. The content delivery system 100 also stores the callback address or URL of the referring webpage as metadata associated with the media program, as shown in block 336. That data is then available to respond to searches related to the media program. For example, a user later performing a keyword search for the media program may be presented with a thumbnail or link to the media program, but also to the URL of the website in which the media program was embedded.

In one embodiment, the metadata associated with the media program is further enhanced by not only providing the URL to the referring webpage having the embedded media program, but also, other metadata that can be obtained from the referring webpage. This feature is illustrated in blocks 328-334. In block 328, the content delivery system 100 transmits a request to the callback address of the referring webpage. That request is received by the third party hosting the webpage 140 and the webpage source is transmitted to the content delivery system 100, as shown in blocks 328-332. In block 332, the webpage source and data is scraped to obtain additional metadata that might be relevant to the media program embedded in the webpage. Scraping may be performed by searching the webpage source for data that is relevant to the media program. Such searching may use metadata already associated with the media program. For example, it may be known that a particular performer is depicted in the embedded media program, and information to that effect may be stored in the database 114. The webpage source may therefore be searched using that performer's name as a keyword, to determine if any additional metadata relevant to the media program is available. In one embodiment, the scraping process includes the discovery of the address of websites and webpages where further information may be found, and those websites and webpages are further explored for additional information. For example, the referring webpage may include a link to a performer's personal website. This website may be accessed, and the contents scraped for further metadata associated with the media program.

Continuing to FIG. 3C, a client device 102 (which may or may not be the same client device 102 described above) transmits a search request (comprising, for example, keywords) to the content delivery system 100, as shown in block 338. The search request implicates the media program discussed above. The content delivery system 100 receives the search request, performs a search of the database 114 according to the keywords, and transmits the search results, as shown in blocks 340 and 342. Since the search request implicated the media program described above, metadata associated with the media program is transmitted to the client device 102. That metadata includes the callback address or URL to the webpage 403 described above, and may include metadata obtained by the scraping process described in blocks 328-334. The search results are received as shown in block 344 and presented to the user 132 using the client device 102.

In one embodiment, callback addresses received in block 322 are filtered to eliminate addresses of webpages that are not of interest or forbidden, such as those associated with web searches. For example, a user 132 may perform execute web search from a home page such as GOOGLE or YAHOO, and the results of the search may include embedded video. Since it may be undesirable to include the address to such a page in the metadata associated with the media program, the callback addresses from such webpages can be ignored or filtered out so they are not stored as metadata.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for obtaining metadata associated with a media program, the method comprising:
   receiving a media program callback message to request the media program at a content delivery system from a client device displaying a webpage retrieved from a host server, wherein:
      the media program is embedded in the retrieved webpage,
      the callback message is generated by the client device executing coded instructions in a source code for the webpage, and
      a callback address to the webpage is included in the callback message by virtue of the callback message being generated;
   parsing the callback message to determine the callback address;
   receiving information for the webpage at the callback address;
   scraping the information for the webpage to determine first metadata that is determined to be relevant to the media program in the webpage; and
   storing the callback address as second metadata associated with the media program and the first metadata in the database, wherein the second metadata indicates the media program in embedded in the webpage identified by the callback address.

2. The method of claim 1, further comprising:
   receiving a request for instructions for embedding the media program in the webpage; and
   transmitting the instructions for embedding the media program in the webpage hosted by the host server, the instructions including a callback to the media program provider.

3. The method of claim 2, further comprising:
   receiving a search request implicating the media program;
   transmitting a search request result, the search request result including the callback address.

4. The method of claim 1, wherein the content delivery system comprises a media server for streaming the media program to the client device and a media program provider for providing an address to the media program stored on the media server.

5. The method of claim 1, further comprising:
   transmitting a request to the callback address for the information for the web page, wherein the information is received in response to the request.

6. The method of claim 1, wherein the information for the webpage comprises webpage source code.

7. The method of claim 1, wherein scraping comprises:
   determining third metadata associated with the media program; and
   using the third metadata during the scraping process to determine if the first metadata is relevant to the media program.

8. An apparatus for obtaining metadata associated with a media program, comprising:
   a content delivery system comprising a communications module for:
      receiving a media program callback message to request the media program from a client device displaying a webpage retrieved from a host server, wherein:
         the media program is embedded in the retrieved webpage,
         the callback message is generated by the client device executing coded instructions in a source code for the webpage, and
         a callback address to the webpage is included in the callback message by virtue of the callback message being generated;
      parsing the callback message to determine the callback address;
      receiving information for the webpage at the callback address;
      scraping the information for the webpage to determine first metadata that is determined to be relevant to the media program in the webpage; and
   a database for storing the callback address as second metadata associated with the media program and the first metadata, wherein the second metadata indicates the media program in embedded in the webpage identified by the callback address.

9. The apparatus of claim 8, wherein:
   the communication module further receives a request for instructions for embedding the media program in the webpage, and transmits the instructions for embedding the media program in the webpage hosted by the host server, the instructions including a callback to the media program provider.

10. The apparatus of claim 9, wherein the communications module further receives a search request implicating the media program and transmits a search request result, the search request result including the callback address.

11. The apparatus of claim 8, wherein:
   the content delivery system comprises a media server for streaming the media program to the client device and a media program provider for providing an address to the media program stored on the media server.

12. The apparatus of claim 8, wherein:
the communication module transmits a request to the callback address for the information for the web page, wherein the information is received in response to the request.

13. The apparatus of claim 8, wherein the information for the webpage comprises webpage source code.

14. The apparatus of claim 8, wherein scraping comprises:
determining third metadata associated with the media program; and
using the third metadata during the scraping process to determine if the first metadata is relevant to the media program.

15. A non-transitory computer-readable storage medium containing instructions, that when executed, control a computer system to be configured for:
receiving a media program callback message to request the media program at a content delivery system from a client device displaying a webpage retrieved from a host server, wherein:
the media program is embedded in the retrieved webpage,
the callback message is generated by the client device executing coded instructions in a source code for the webpage, and
a callback address to the webpage is included in the callback message by virtue of the callback message being generated;
parsing the callback message to determine the callback address;
receiving information for the webpage at the callback address;
scraping the information for the webpage to determine first metadata that is determined to be relevant to the media program in the webpage; and
storing the callback address as second metadata associated with the media program and the first metadata in the database, wherein the second metadata indicates the media program in embedded in the webpage identified by the callback address.

16. The non-transitory computer-readable storage medium of claim 15, further operable for:
receiving a request for instructions for embedding the media program in the webpage; and
transmitting the instructions for embedding the media program in the webpage hosted by the host server, the instructions including a callback to the media program provider.

17. The non-transitory computer-readable storage medium of claim 16, further operable for:
receiving a search request implicating the media program device;
transmitting a search request result, the search request result including the callback address.

18. The non-transitory computer-readable storage medium of claim 15, wherein:
the content delivery system comprises a media server for streaming the media program to the client device and a media program provider for providing an address to the media program stored on the media server.

19. The non-transitory computer-readable storage medium of claim 15, further operable for:
transmitting a request to the callback address or the information for the web page, wherein the information is received in response to the request.

20. The non-transitory computer readable medium of claim 15, wherein the information for the webpage comprises webpage source code.

\* \* \* \* \*